(12) United States Patent
Yonezawa et al.

(10) Patent No.: US 8,798,420 B2
(45) Date of Patent: Aug. 5, 2014

(54) MULTI-MODE OPTICAL FIBER

(75) Inventors: Kazuhiro Yonezawa, Yokohama (JP);
Sumio Hoshino, Yokohama (JP)

(73) Assignee: Sumitomo Electric Industries, Ltd.,
Osaka-shi, Osaka (JP)

( * ) Notice: Subject to any disclaimer, the term of this patent is extended or adjusted under 35 U.S.C. 154(b) by 56 days.

(21) Appl. No.: 13/419,767

(22) Filed: Mar. 14, 2012

(65) Prior Publication Data

US 2013/0243379 A1    Sep. 19, 2013

(51) Int. Cl.
*G02B 6/02*    (2006.01)
*G02B 6/036*   (2006.01)
*G02B 6/293*   (2006.01)

(52) U.S. Cl.
CPC .............. *G02B 6/03644* (2013.01); *G02B 6/02* (2013.01); *G02B 6/03627* (2013.01); *G02B 6/03611* (2013.01); *G02B 6/29377* (2013.01)
USPC ........................................................ 385/123

(58) Field of Classification Search
CPC .. G02B 6/02; G02B 6/03611; G02B 6/03627; G02B 6/03644; G02B 6/29377
USPC .................................................. 385/12, 123
See application file for complete search history.

(56) References Cited

U.S. PATENT DOCUMENTS

| 7,231,121 B2 | 6/2007 | Park et al. | |
|---|---|---|---|
| 2005/0180714 A1* | 8/2005 | Sano et al. | 385/132 |
| 2008/0166094 A1* | 7/2008 | Bookbinder et al. | 385/124 |

FOREIGN PATENT DOCUMENTS

| JP | 2003-315184 | 11/2003 |
|---|---|---|
| JP | 2006-58494 | 3/2006 |
| JP | 2007-197273 | 8/2007 |
| JP | 2011-10296 | 1/2011 |
| JP | 2011-102964 A | 5/2011 |

* cited by examiner

*Primary Examiner* — Jerry Blevins
(74) *Attorney, Agent, or Firm* — Drinker Biddle & Reath LLP (57) ABSTRACT

The present invention relates to a GI-type multi-mode optical fiber in which the outer diameter 2a of a core is 47.5 to 52.5 μm or 60 to 65 μm. In the multi-mode optical fiber, stress in the optical axis direction remaining in an outermost peripheral portion of the cladding is tensile stress of 0 to 25 MPa, the outermost peripheral portion of the cladding being defined as a region having a diameter of 1.8b or more when the diameter of the cladding is 2b.

11 Claims, 7 Drawing Sheets

MULTI-MODE OPTICAL FIBER

BACKGROUND OF THE INVENTION

1. Field of the Invention

The present invention relates to a multi-mode optical fiber.

2. Related Background Art

It is known that a multi-mode optical fiber structurally has greater transmission loss in comparison to a single mode optical fiber for use in long-haul optical communication. Meanwhile, a multi-mode optical fiber is broadly used in short-haul information communication, in a LAN (Local Area Network) for example, because inter-fiber connection is easy since connection loss is small, and a network can be built easily using equipment with a low required performance.

SUMMARY OF THE INVENTION

The present inventors have examined the above prior art, and as a result, have discovered the following problems.

Namely, from the perspective of increasing the speed of short-haul information communication, research regarding multi-mode optical fibers suitable for high-speed transmission has been actively conducted from the past. Nevertheless, research regarding physically reliable multi-mode optical fibers from the perspective of connecting procedures via fusion within the communication base has hardly been conducted.

Referring to the cross section structure of a multi-mode optical fiber, for example, while the core is doped with a large amount of Ge element, the cladding is not doped with the Ge element and, therefore, the core and the cladding have different glass viscosity. Moreover, since the occupied area of the core or the trench portion with different glass viscosity will increase, large tensile stress tends to occur in the cladding due to the configuration or drawing conditions of the drawing apparatus. When tensile stress remains in the outermost peripheral portion of the manufactured multi-mode optical fiber (region near the surface of the multi-mode optical fiber and region corresponding to the outer portion of the cladding), it is likely that the multi-mode optical fiber will be damaged upon handling such multi-mode optical fiber mainly composed of silica glass; specifically, during the connecting procedures via fusion or upon bending the multi-mode optical fiber at a small curvature radius.

Moreover, in the case of a multi-mode optical fiber, the occupied area of the cladding is structurally small. Thus, as a countermeasure for dealing with the foregoing residual tensile stress, if adding a different dopant to the outermost peripheral portion or providing a compressive strain layer during a process involving heating so that compressive stress in the optical axis direction will remain in the outermost peripheral portion of the cladding, there is a possibility that this may also affect the core which determines light transmission properties.

The present invention has been developed to eliminate the problems described above. It is an object of the present invention to provide a physically reliable multi-mode optical fiber in which the possibility of damage during the handling thereof such as in the connecting procedures via fusion can be effectively reduced by adjusting the tensile stress remaining, out of the cladding, in the outermost peripheral portion of the cladding that is closest to the fiber surface.

The present invention relates to a GI (Graded Index)-type multi-mode optical fiber, and the multi-mode optical fiber is clearly different from a single mode optical fiber for use in long-haul transmission in terms of structure. Moreover, the GI-type multi-mode optical fiber includes, in addition to a multi-mode optical fiber having a general structure configured from a core with a high refractive index and a cladding with a low refractive index, a GI-type multi-mode optical fiber comprising a trench portion with a low refractive index provided between the core and the cladding (hereinafter referred to as the "BI-type multi-mode optical fiber"). Note that the trench portion has a refractive index that is lower than that of the cladding, and offers, to the multi-mode optical fiber, resistance against fluctuation in the transmission properties caused by bending. Moreover, when the term "multi-mode optical fiber" is simply used in this specification, reference is made to the GI-type multi-mode optical fiber, as well as to the BI-type multi-mode optical fiber belonging to the GI-type multi-mode optical fiber.

Namely, the multi-mode optical fiber according to the present invention comprises, as a GI-type multi-mode optical fiber, a core extending along an optical axis direction and doped with $GeO_2$ (germanium dioxide), and a cladding provided to an outer periphery of the core and having a refractive index that is lower than that of the core.

Moreover, the multi-mode optical fiber according to the present invention comprises, as a BI-type multi-mode optical fiber, a core extending along an optical axis direction and doped with $GeO_2$ (germanium dioxide), a trench portion provided to an outer periphery of the core and having a refractive index that is lower than that of the core, and a cladding provided to an outer periphery of the trench portion and having a refractive index that is lower than that of the core but higher than that of the trench portion. Note that the trench portion has an inner diameter that is greater than 2a, and an outer diameter that is smaller than 1.8b.

In the multi-mode optical fiber according to the present invention, an $\alpha$ value of a portion corresponding to the core is 1.9 to 2.2, and a diameter 2a of the core is 47.5 to 52.5 μm or 60 to 65 μm, a refractive index profile of the multi-mode optical fiber in a radial direction. Moreover, preferably, a relative refractive index difference $\Delta$ of the center of the core (maximum relative refractive index difference of the core) with respect to the reference region of cladding is 0.8 to 2.4%. Note that, when the cladding is configured from a plurality of regions, the region positioned outermost is defined as the reference region.

Particularly, in the multi-mode optical fiber according to the present invention, stress (residual stress) in the optical axis direction remaining in an outermost peripheral portion of the cladding is tensile stress of 0 to 25 MPa, the outermost peripheral portion being defined as a region having a diameter of 1.8b or more when the diameter of the cladding (synonymous with the outer diameter of the glass) is 2b.

More preferably, the stress in the optical axis direction remaining in the outermost peripheral portion of the cladding is tensile stress of 0 to 10 MPa. If the tensile stress in the outermost peripheral portion of the cladding is inhibited to 0 to 10 MPa, the physical reliability of the multi-mode optical fiber will increase and, therefore, the handling thereof will become even easier.

Note that, generally speaking, the stress remaining in the optical fiber changes keenly based on the configuration, conditions and the like of the drawing apparatus (manufacturing equipment of optical fibers). Thus, for instance, by intentionally changing the tension (drawing tension) that is applied to one end (portion that softened due to heating) of the preform during the drawing process, the stress (tensile stress or compressive stress) in the optical axis direction remaining inside the optical fiber obtained after the drawing can be easily adjusted.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

In the following, embodiments of the multi-mode optical fiber according to the present invention will be explained in detail with reference to FIGS. 1A to 2B, 3, 4A to 4B, and 5 to 7. In the description of the drawings, identical or corresponding components are designated by the same reference numerals, and overlapping description is omitted.

Figure 1A:
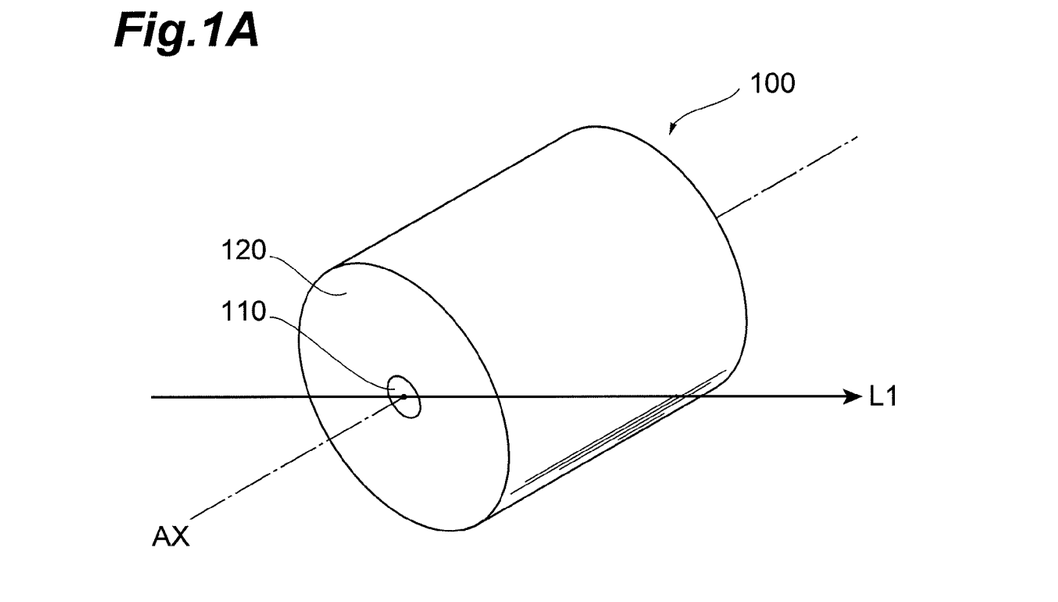
FIG. 1A is a view showing a representative cross section structure of the preform for obtaining the GI-type multi-mode optical fiber as one example of the multi-mode optical fiber according to the present invention.
Figure 1B:
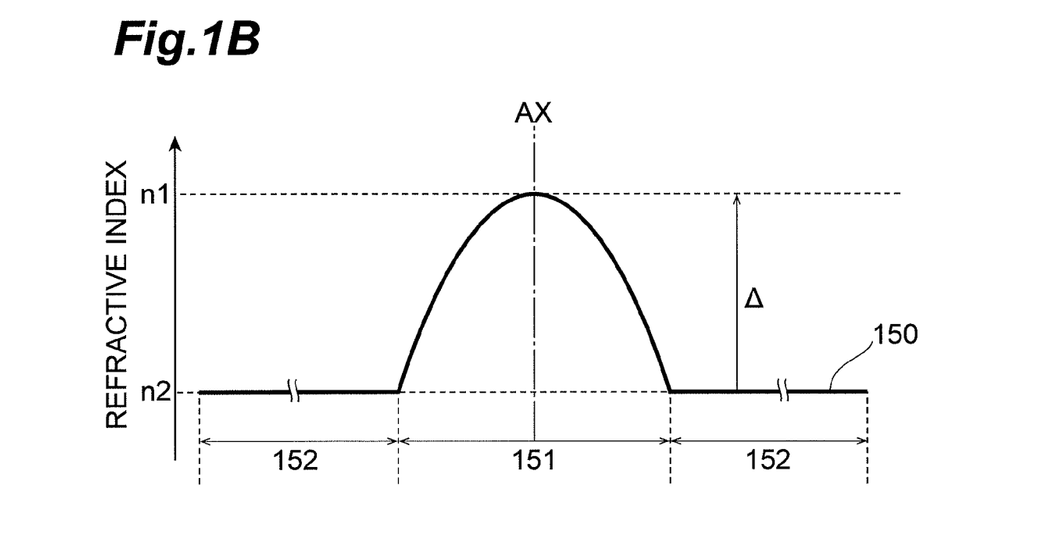
FIG. 1B is a view showing the refractive index profile thereof.

FIG. 1A is a view showing a representative cross section structure of the preform (hereinafter referred to as the "GI-type preform") for obtaining the GI-type multi-mode optical fiber as one example of the multi-mode optical fiber according to the present invention, and FIG. 1B is a view showing the refractive index profile thereof. Moreover, FIG. 4A is a view showing a representative cross section structure of the GI-type multi-mode optical fiber manufactured by the drawing apparatus 300 shown in FIG. 3. The GI-type preform 100 shown in FIG. 1A is mainly composed of silica glass, and comprises a first region 110 extending along an optical axis AX, and a second region 120 provided to the outer periphery of the first region 110. The GI-type multi-mode optical fiber 500A shown in FIG. 4A comprises a core 510A of a diameter 2a extending along an optical axis direction (AX illustrates the optical axis), and a cladding 520A of a diameter (outer diameter) 2b provided to the outer periphery of the core 510A, wherein the core 510A corresponds to the first region 110, and the cladding 520A (a single layer in the example of FIG. 1A and which is used as the reference region for defining the relative refractive index difference) corresponds to the second region 120. In the GI-type preform 100 shown in FIG. 1A, the first region 110 corresponding to the core 510A is doped with $GeO_2$ for adjusting the shape of the refractive index profile, and has a maximum refractive index n1. The second region 120 corresponding to the cladding 520A is a glass region composed of pure silica glass or doped with impurities for adjusting the refractive index, and has a refractive index n2 that is lower than that of the first region 110.

As a result of drawing the GI-type preform 100 so that the outer diameter of the glass becomes 2b, the GI-type multi-mode optical fiber 500A shown in FIG. 4A can be obtained. Thereupon, stress remains in the cladding 520A of the GI-type multi-mode optical fiber 500A, and tensile stress is generated in the optical axis direction (direction along the optical axis AX). Thus, in this embodiment, an outermost peripheral portion 521A in the cladding 520A of the diameter (synonymous with the outer diameter of the glass) 2b is defined as a circular region having an inner diameter 1.8b and an outer diameter 2b within the cladding 520A, and the residual stress in the optical axis direction that is generated in the outermost peripheral portion 521A is adjusted to be tensile stress of 25 MPa or less, preferably 10 MPa or less (needless to say, the residual stress may also be 0 MPa).

Figure 2A:
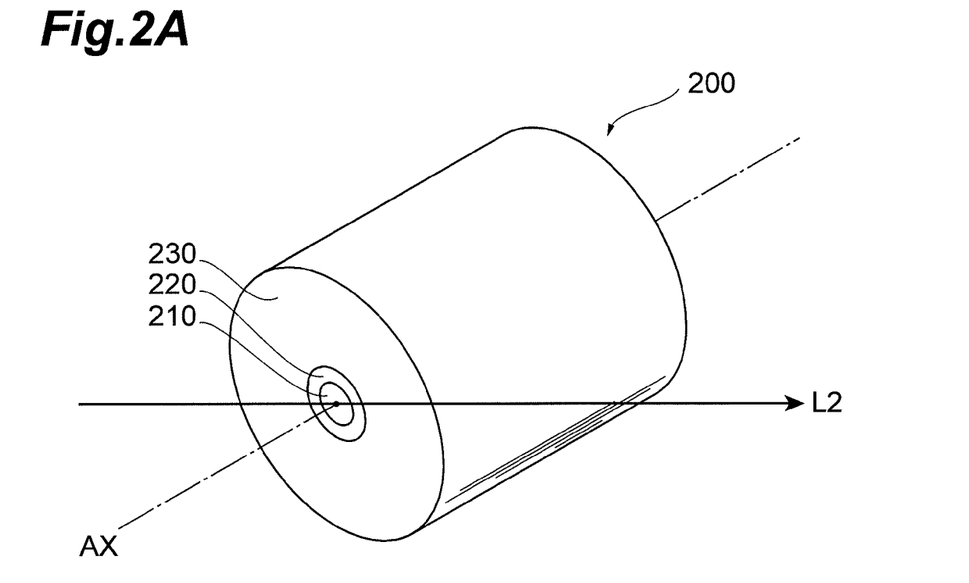
FIG. 2A is a view showing a representative cross section structure of the preform for obtaining the BI-type multi-mode optical fiber as another example of the multi-mode optical fiber according to the present invention.
Figure 2B:
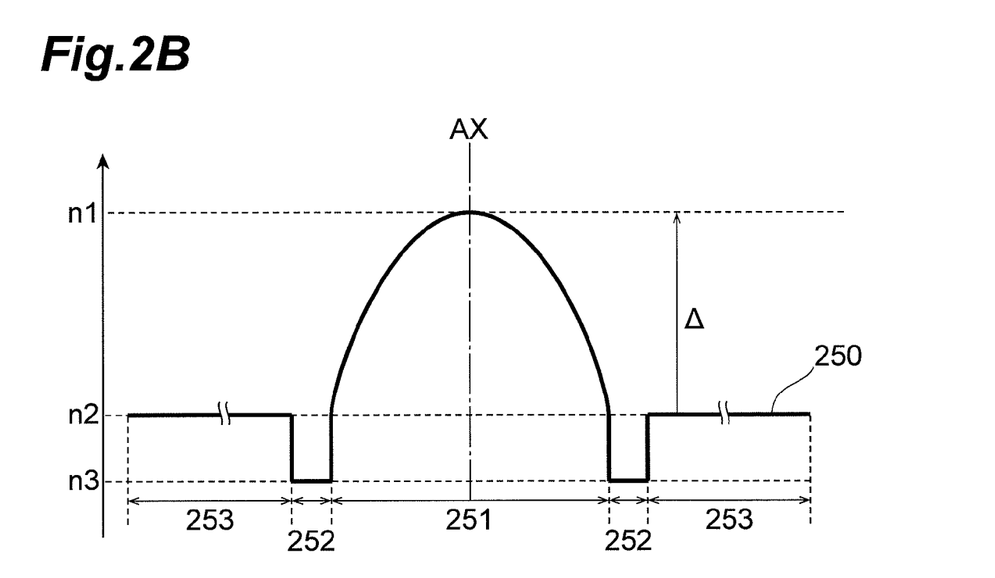
FIG. 2B is a view showing the refractive index profile thereof.

FIG. 2A is a view showing a representative cross section structure of the preform (hereinafter referred to as the "BI-type preform") for obtaining the BI-type multi-mode optical fiber as another example of the multi-mode optical fiber according to the present invention, and FIG. 2B is a view showing the refractive index profile thereof. Moreover, FIG. 4B is a view showing a representative cross section structure of the BI-type multi-mode optical fiber manufactured with the drawing apparatus 300 shown in FIG. 3. The BI-type preform 200 shown in FIG. 2A is mainly composed of silica glass, and comprises a first region 210 extending along an optical axis AX, a second region 220 of a low refractive index provided to the outer periphery of the first region 210, and a third region 230 provided to the outer periphery of the second region 220. The BI-type multi-mode optical fiber 500B shown in FIG. 4B comprises a core 510B of a diameter 2a extending along an optical axis direction (AX illustrates the optical axis), a trench portion 520B provided to the outer periphery of the core 510B, and a cladding 530B provided to the outer periphery of the trench portion 520B, wherein the core 510B corresponds to the first region 210, the trench portion 520B corresponds to the second region 220, and the cladding 530B (which is used as the reference region for defining the relative refractive index difference) corresponds to the third region 230. Note that, in the BI-type preform 200 shown in FIG. 2A, the first region 210 corresponding to the core 510B is doped with $GeO_2$ for adjusting the shape of the refractive index profile, and has a maximum refractive index n1. The second region 220 corresponding to the trench portion 520B is doped with a refractive index lowering dopant such as fluorine for providing bending resistance to the obtained BI-type multi-mode optical fiber 500B, and has a refractive index n3 (<n1). The third region 230 corresponding to the cladding 530B is a glass region composed of pure silica or doped with impurities for adjusting the refractive index, and has a refractive index n2 (n3<n2<n1) that is lower than that of the first region 210 and higher than that of the second region 220.

As a result of drawing the BI-type preform 200 so that the outer diameter of the glass becomes 2b, the BI-type multi-mode optical fiber 500B shown in FIG. 4B can be obtained. Thereupon, stress remains in the cladding 530B of the BI-type multi-mode optical fiber 500B, and tensile stress is generated in the optical axis direction (direction along the optical axis AX). Thus, in the present embodiment, an outermost peripheral portion 531B in the cladding 530B of the diameter (synonymous with the outer diameter of the glass) 2b is defined as a circular region having an inner diameter 1.8b and an outer diameter 2b within the cladding 530B, and the residual stress in the optical axis direction that is generated in the outermost peripheral portion 531B is adjusted to be tensile stress of 25 MPa or less, preferably 10 MPa or less (needless to say, the residual stress may also be 0 MPa).

In addition, the GI-type preform 100 has a refractive index profile 150 shown in FIG. 1B. The refractive index profile 150 shown in FIG. 1B illustrates the refractive index of the respective parts on a line L1 (coincides with the radial direction of the GI-type preform 100) that is orthogonal to the optical axis AX in FIG. 1A, and more specifically a region 151 shows the refractive index of the respective parts of the first region 110 along the line L1 (region to become the core 510A after the drawing), and a region 152 shows the refractive index of the respective parts of the second region 120 along the line L1 (region to become the cladding 520A after the drawing), respectively.

In particular, the region 151 in the refractive index profile 150 of FIG. 1B has a dome shape so that the refractive index becomes maximum at the center of the first region 110 which coincides with the optical axis AX. Accordingly, the concentration of $GeO_2$ added for adjusting the refractive index also decreases sharply from the center of the first region 110 toward the second region 120. The α value for defining this dome shape is 1.9 to 2.2. The relative refractive index difference A (corresponds to the maximum relative refractive index difference of the core 510A with respect to the cladding 520A) of the center of the first region 110 with respect to the second region (a single layer in the example of FIG. 1A and which is used as the reference region for defining the relative refractive index difference) 120 is 0.8 to 2.4%. Note that the diameter 2a of the core 510A in the obtained GI-type multi-mode optical fiber 500A is 47.5 to 52.5 μm or 60 to 65 μm (see FIG. 4A).

Meanwhile, the BI-type preform 200 has a refractive index profile 250 shown in FIG. 2B. Note that the refractive index profile 250 shown in FIG. 2B illustrates the refractive index of the respective parts on a line L2 (coincides with the radial direction of the BI-type preform 200) that is orthogonal to the optical axis AX in FIG. 2A, and more specifically a region 251 shows the refractive index of the respective parts of the first region 210 along the line L2 (region to become the core 510B after the drawing), a region 252 shows the refractive index of the respective parts of the second region 220 along the line L2 (region to become the trench portion 520B after the drawing), and a region 253 shows the refractive index of the respective parts of the third region 230 along the line L2 (region to become the cladding 530B after the drawing). Note that, in both the GI-type and BI-type multi-mode optical fibers 500A, 500B, the shape of the refractive index profile of the cores 510A, 510B is common.

Namely, the region 251 in the refractive index profile 250 of FIG. 2B has a dome shape so that the refractive index becomes maximum at the center of the first region 210 which coincides with the optical axis AX. Accordingly, the concentration of $GeO_2$ added for adjusting the refractive index also decreases sharply from the center of the first region 210 toward the second region 220 and the third region 230. The α value for defining this dome shape is 1.9 to 2.2. The relative refractive index difference A (corresponds to the maximum relative refractive index difference of the core 510B with respect to the cladding 530B) of the center of the first region 210 with respect to the third region (which is used as the reference region for defining the relative refractive index difference) 230 is 0.8 to 2.4%. Note that the diameter 2a of the core 510B in the obtained BI-type multi-mode optical fiber 500B is 47.5 to 52.5 μm or 60 to 65 μm (see FIG. 4B).

Figure 3:
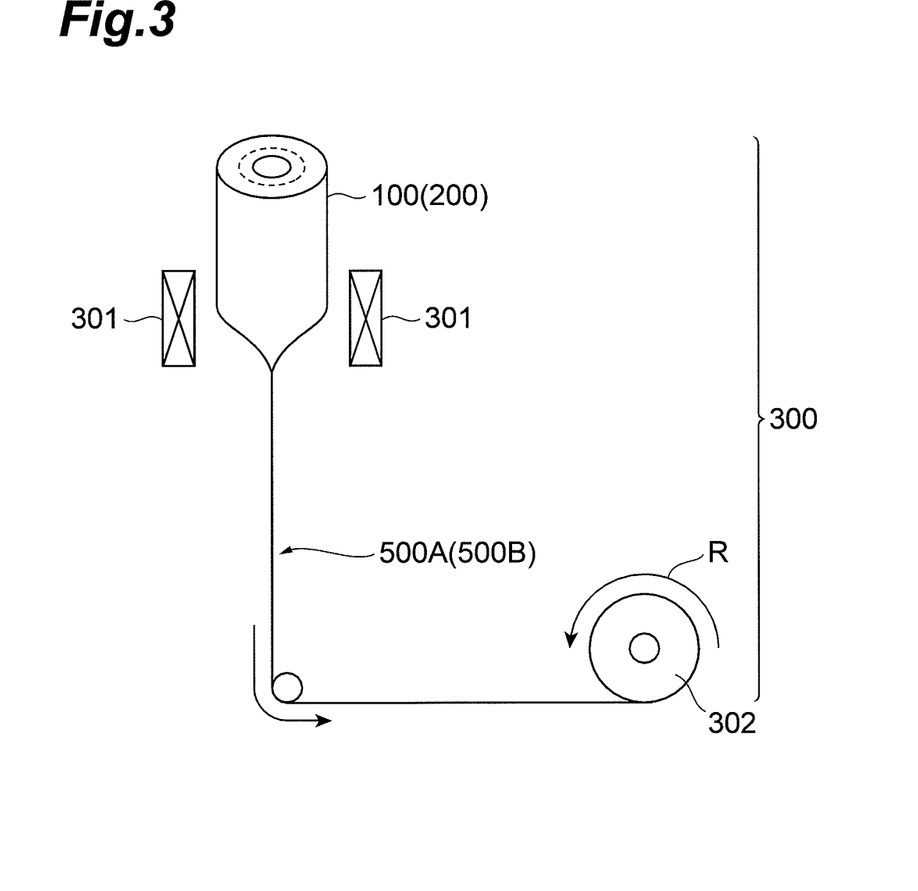
FIG. 3 is a view showing the schematic structure of the drawing apparatus for obtaining the multi-mode optical fiber.
Figure 4A:
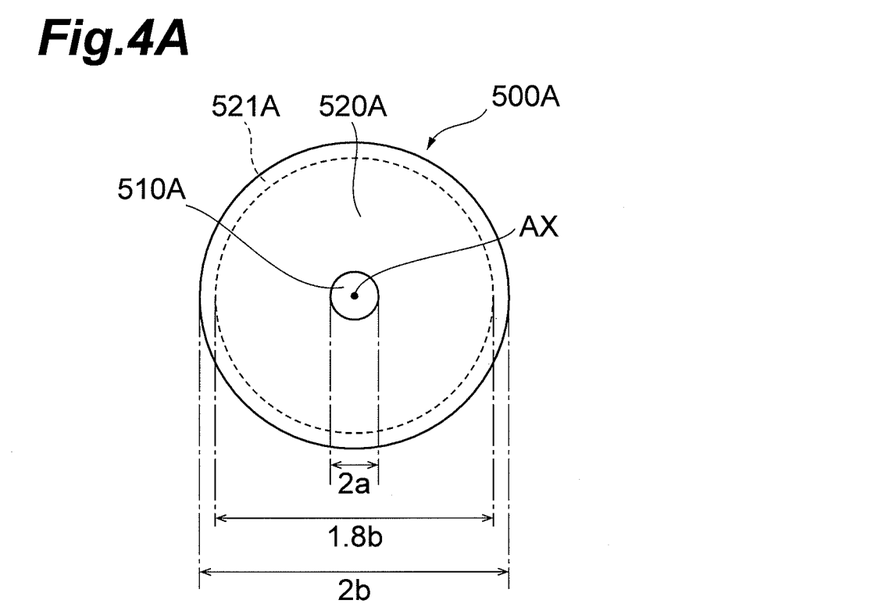
FIG. 4A shows a representative cross section structure of the GI-type multi-mode optical fiber obtained with the drawing apparatus shown in FIG. 3.
Figure 4B:
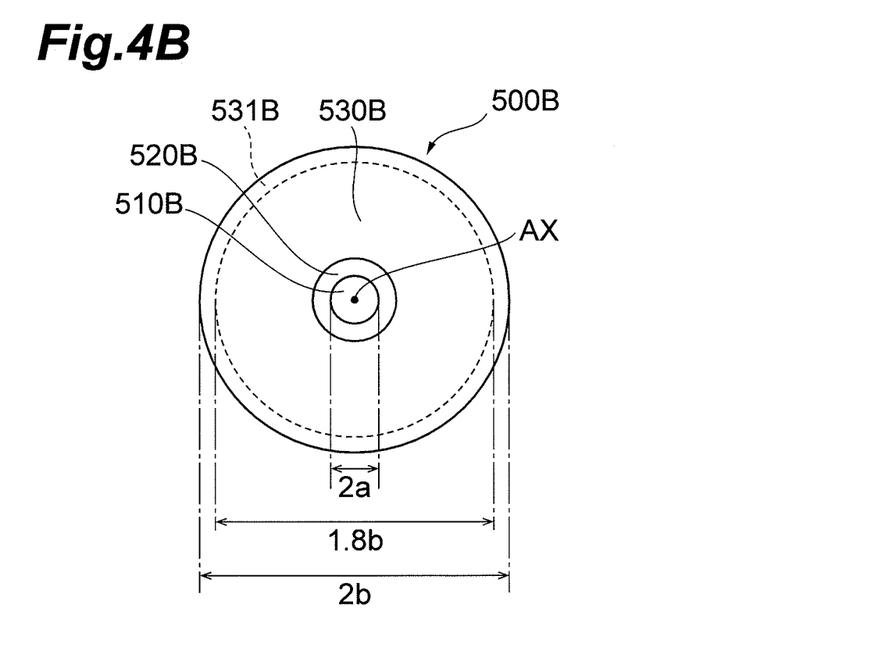
FIG. 4B shows a representative cross section structure of the BI-type multi-mode optical fiber as another configuration of the GI-type multi-mode optical fiber.

One end of each of the GI-type preform 100 (FIG. 1A) and the BI-type preform 200 (FIG. 2A) having the structure described above is drawn by the drawing apparatus 300 shown in FIG. 3, and then the desirable GI-type multi-mode optical fiber 500A and the BI-type multi-mode optical fiber 500B can be obtained. Note that the drawing apparatus 300 shown in FIG. 3 comprises, at least, a heater 301 for heating one end of the set GI-type preform 100 or BI-type preform 200, and a winding drum 302 for winding the heated one end of the preform 100 (200) while adding predetermined tension thereto. While the winding drum 302 rotates in a direction shown with an arrow R in FIG. 3, the outer diameter of the cladding and the core is adjusted by adjusting the rotating speed of the winding drum 302. Moreover, by adjusting the heating temperature by the heater 301, the tension (drawing tension) that is added to the heated one end of the preform 100 (200) is adjusted.

Generally speaking, the residual stress remaining in the optical axis direction of the optical fiber changes keenly based on the configuration, conditions and the like of manufacturing equipment such as the drawing apparatus 300. Thus, in this embodiment, as a representative example, a case of adjusting the residual stress (tensile stress or compressive stress) of the GI-type multi-mode optical fiber 500A obtained after the drawing by intentionally changing the drawing tension that is applied to one end (portion that softened due to heating) of the GI-type preform 100 during the drawing process is now explained with reference to FIG. 5 to FIG. 7. Since the BI-type multi-mode optical fiber 500B has the same cladding structure that is common with the respective samples of the GI-type multi-mode optical fiber 500A explained below, the redundant explanation thereof is omitted.

Figure 5:
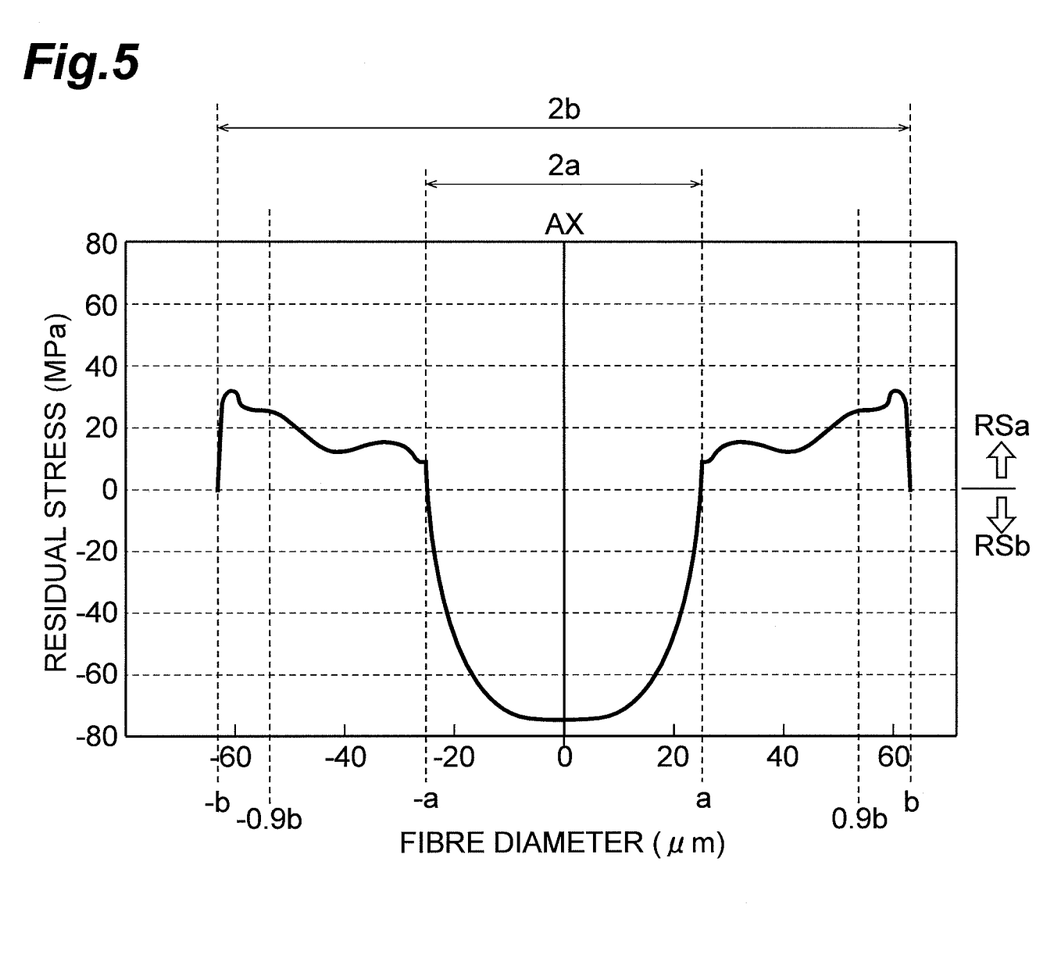
FIG. 5 is a view showing the residual stress (tensile stress or compressive stress) in the respective parts of the GI-type multi-mode optical fiber obtained by drawing the preform shown in FIG. 1A with a drawing tension of 200 g.
Figure 6:
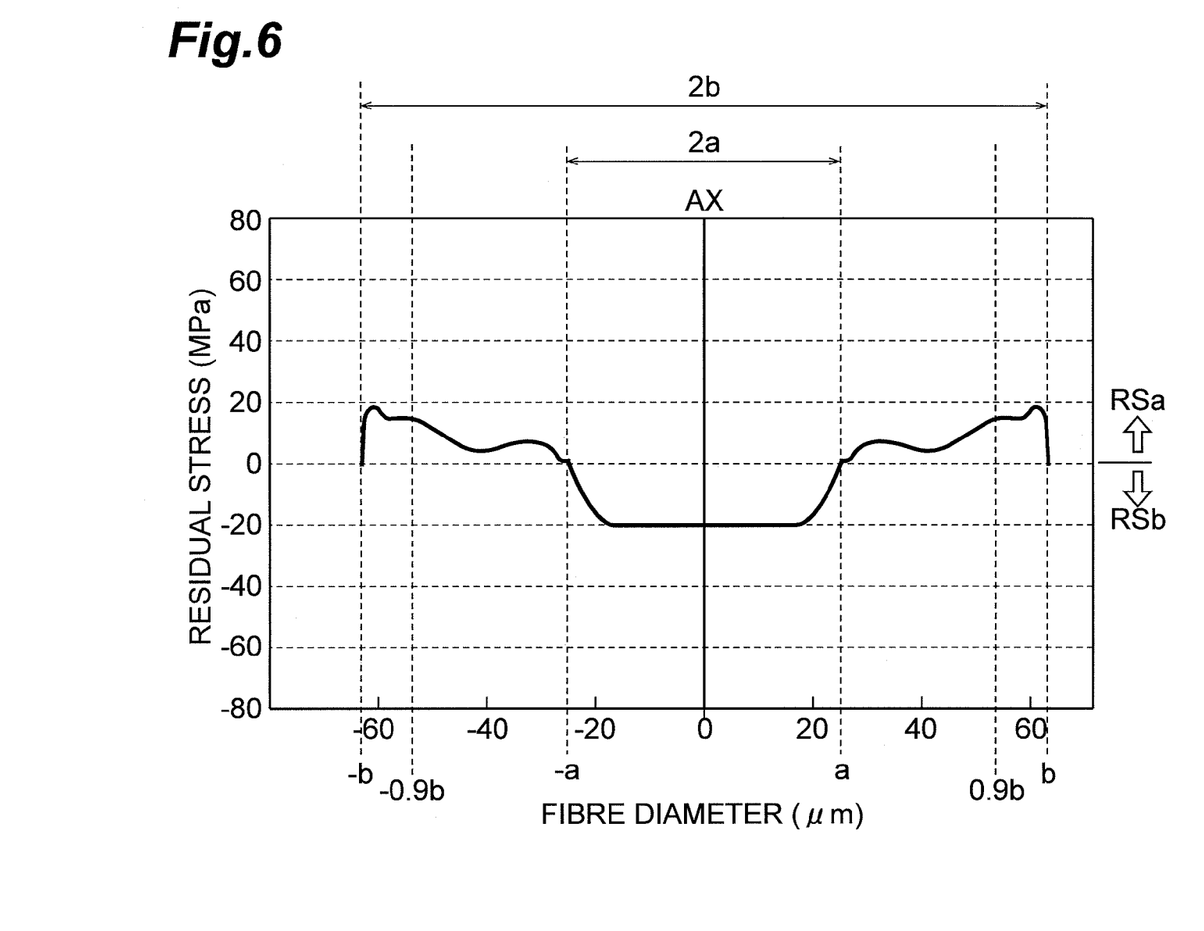
FIG. 6 is a view showing the residual stress (tensile stress or compressive stress) in the respective parts of the GI-type multi-mode optical fiber obtained by drawing the preform shown in FIG. 1A with a drawing tension of 100 g.
Figure 7:
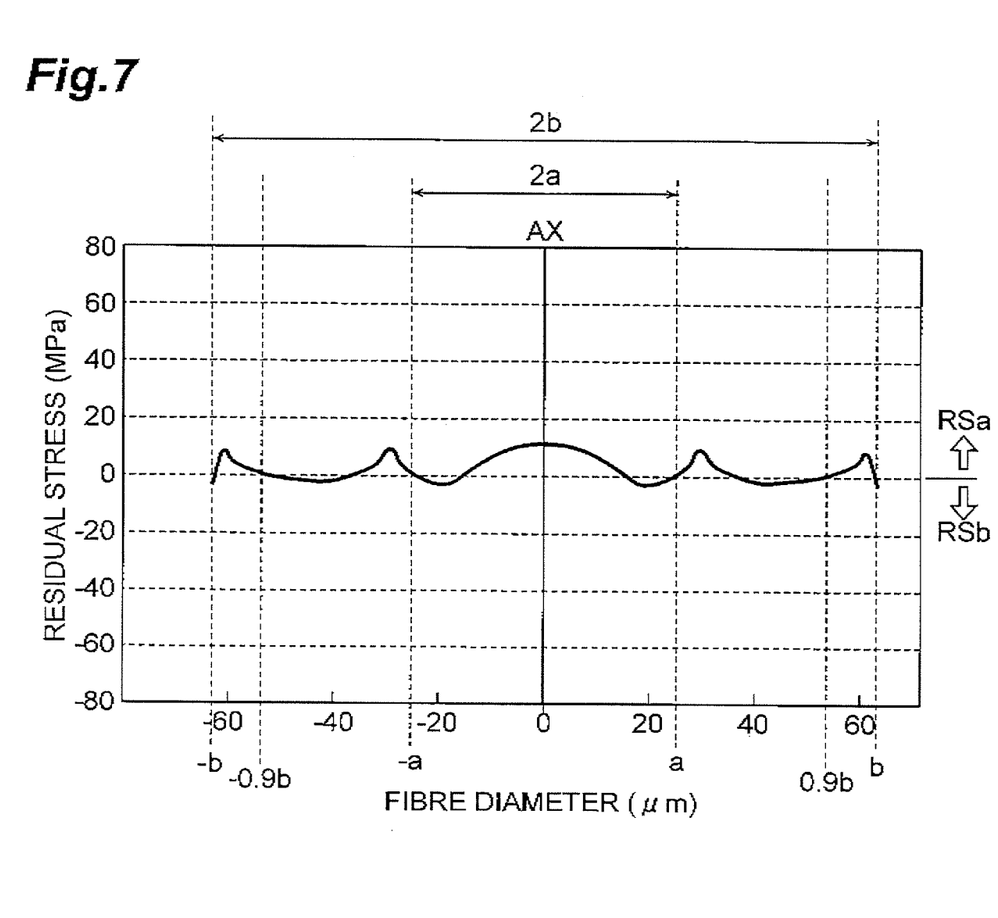
FIG. 7 is a view showing the residual stress (tensile stress or compressive stress) in the respective parts of the GI-type multi-mode optical fiber obtained by drawing the preform shown in FIG. 1A with a drawing tension of 50 g.

FIG. 5 to FIG. 7 are views showing the residual stress of the GI-type multi-mode optical fiber manufactured by drawing the GI-type preform shown in FIG. 1A and FIG. 1B based on various drawing tensions. Note that, in each of FIG. 5 to FIG. 7, the vertical axis represents the residual stress (MPa) of the GI-type multi-mode optical fiber 500A in the optical axis direction, and the horizontal axis represents the fiber diameter (μm) of the GI-type multi-mode optical fiber 500A in which the coordinates with the intersection with the optical axis AX are the origin. In addition, in each of FIG. 5 to FIG. 7, the range of the positive residual stress (region shown with an arrow RSa in the view) shows the region where tensile stress remains as residual stress. Meanwhile, the range of the negative residual stress (region shown with an arrow RSb in the view) shows the region where compressive stress remains as residual stress.

Generally speaking, upon drawing an optical fiber, a part of the GI-type preform once becomes a molten state, and becomes cooled (solidified) from the outer peripheral portion to the center thereafter after being drawn. Here, if the drawing tension is high, the outer peripheral portion that solidified first is drawn in the longitudinal direction while being subject to greater tension. Subsequently, even when the drawn optical fiber is completely solidified and the obtained optical fiber is released from tension, large tensile stress will remain in the outer peripheral portion of the optical fiber that was drawn considerably due to the tension even if cooling advances. Accordingly, the higher the tension (drawing tension) that is applied during the drawing of the optical fiber, the greater the tensile stress that remains in the outer peripheral portion of the optical fiber after the drawing.

Samples of the GI-type multi-mode optical fiber 500A manufactured based on various drawing tensions were examined, and the results are shown below. Note that, in order to obtain this GI-type multi-mode optical fiber 500A, the GI-type preform 100 was manufactured with the maximum relative refractive index difference $\Delta$ of the first region 110 with respect to the second region 120 as 1.17%, and the a value which defines the shape of the refractive index profile in the first region 110 as 2.10.

FIG. 5 is a view showing the residual stress (tensile stress or compressive stress) in the respective parts of the GI-type multi-mode optical fiber 500A (sample 1) obtained by drawing the GI-type preform 100 manufactured as described above with a drawing tension of 200 g by using the drawing apparatus 300 shown in FIG. 3.

In the sample 1 that was drawn with the drawing tension of 200 g, the tensile stress of the outermost peripheral portion 521A in the optical axis direction in the cladding 520A is a large value at a maximum of 30 MPa. Accordingly, in the sample 1, since large tensile stress of 30 MPa remains near the fiber surface, rupture can easily occur from the fiber surface (surface of the outermost peripheral portion 521A). In particular, there is a problem in that the fiber surface is easily damaged due to physical scratches or stress upon handling the optical fiber after peeling the cladding resin such as during the connecting procedures of the optical fibers via fusion. Consequently, the obtained sample 1 is a multi-mode optical fiber which not only has problems in guaranteeing physical reliability, there is also a possibility that the safety of workers may be compromised.

FIG. 6 is a view showing the residual stress (tensile stress or compressive stress) in the respective parts of the GI-type multi-mode optical fiber 500A (sample 2) obtained by drawing the GI-type preform 100 manufactured as described above with a drawing tension of 100 g by using the drawing apparatus 300 shown in FIG. 3.

In the sample 2 that was drawn with the drawing tension of 100 g, the tensile stress of the outermost peripheral porion 521A in the optical axis direction in the cladding 520A has reduced to a maximum of 18 MPa. Accordingly, in the sample 2, since the tensile stress has decreased up to a maximum of 18 MPa, the sample 2 is a multi-mode optical fiber that can be easily handled and will not be damaged easily upon handling after peeling the coating.

FIG. 7 is a view showing the residual stress (tensile stress or compressive stress) in the respective parts of the GI-type multi-mode optical fiber 500A (sample 3) obtained by drawing the GI-type preform 100 manufactured as described above with a drawing tension of 50 g by using the drawing apparatus 300 shown in FIG. 3.

In the sample 3 that was drawn with the drawing tension of 50 g, the tensile stress of the outermost peripheral portion 521A in the optical axis direction in the cladding 520A has reduced to a maximum of 9 MPa. Accordingly, in the sample 3, since the tensile stress has further decreased up to a maximum of 9 MPa, the sample 3 is a GI-type multi-mode optical fiber that can be easily handled and will not be damaged easily upon handling after peeling the coating, and which is particularly suitable for work requiring bending at a small curvature.

Accordingly, the multi-mode optical fiber according to the present invention (both the GI-type and the BI-type included in the GI-type) is suitable for used as a transmission medium of short-haul information communication such as a LAN, and the inter-fiber connection is facilitated since the core diameter thereof is large at 47.5 to 52.5 μm or 60 to 65 μm.

Meanwhile, if great tensile stress remains near the fiber surface (outermost peripheral portion of the cladding), such tensile stress may cause damage or rupture during the connecting procedure of the optical fibers via fusion. In addition, if a compressive stress layer is provided to the outermost peripheral portion, there is a possibility that this will have an adverse effect on the core as the optical transmission region since the occupied area of the cladding in the cross section of the multi-mode optical fiber is small. Moreover, the process for providing the compressive stress layer will increase and the manufacturing costs will also increase. The multi-mode optical fiber according to the present invention can also resolve the foregoing problems. Specifically, in accordance with the multi-mode optical fiber of the present invention, the manufacturing costs will not increase significantly since the residual stress in the outermost peripheral portion of the cladding (near the surface of the multi-mode optical fiber) can be controlled based on the drawing conditions (for instance, drawing tension and change of heat history during drawing).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-mode optical fiber, comprising:
   a core extending along an optical axis direction and doped with $GeO_2$; and
   a cladding provided to an outer periphery of the core and having a refractive index lower than that of the core,
   wherein, in a refractive index profile in a diametric direction of the multi-mode optical fiber, an $\alpha$ value of a portion corresponding to the core is 1.9 to 2.2, a maximum relative refractive index difference $\Delta$ of the core with respect to the cladding is 0.8 to 2.4%, and a diameter 2a of the core is 47.5 to 52.5 μm or 60 to 65 μm,
   wherein stress in the optical axis direction remaining in an outermost peripheral portion of the cladding is tensile stress of 0 to 25 MPa, the outermost peripheral portion being defined as a region having a diameter of 1.8b or more when the diameter of the cladding is 2b, and
   wherein, in a cross section of the multi-mode optical fiber orthogonal to the optical axis direction, an inner portion completely surrounded by the outermost peripheral portion includes a part in which compressive stress remains as the stress in the optical axis direction.

2. The multi-mode optical fiber according to claim 1, wherein the stress in the optical axis direction remaining in the outermost peripheral portion of the cladding is tensile stress of 0 to 10 MPa.

3. The multi-mode optical fiber according to claim 1, further comprising a trench portion provided between the core and the cladding and having a refractive index lower than that of the cladding.

4. The multi-mode optical fiber according to claim 3, wherein the trench portion has an inner diameter greater than 2a, and an outer diameter smaller than 1.8b.

5. The multi-mode optical fiber according to claim 3, wherein the stress in the optical axis direction remaining in the outermost peripheral portion of the cladding is tensile stress of 0 to 10 MPa.

6. The multi-mode optical fiber according to claim 1, wherein the stress in the optical axis direction remaining in the core is the compressive stress.

7. A multi-mode optical fiber, comprising:
- a core extending along an optical axis direction and doped with $GeO_2$;
- a cladding provided to an outer periphery of the core and having a refractive index lower than that of the core; and
- a trench portion provided between the core and the cladding and having a refractive index lower than that of the cladding,
- wherein, in a refractive index profile in a diametric direction of the multi-mode optical fiber, an $\alpha$ value of a portion corresponding to the core is 1.9 to 2.2, a maximum relative refractive index difference $\Delta$ of the core with respect to the cladding is 0.8 to 2.4%, and a diameter 2a of the core is 47.5 to 52.5 μm or 60 to 65 μm,
- wherein stress in the optical axis direction remaining in an outermost peripheral portion of the cladding is tensile stress of 0 to 25 MPa, the outermost peripheral portion being defined as a region having a diameter of 1.8b or more when the diameter of the cladding is 2b, and
- wherein, in a cross section of the multi-mode optical fiber orthogonal to the optical axis direction, an inner portion completely surrounded by the outermost peripheral portion includes a part in which compressive stress remains as the stress in the optical axis direction.

8. The multi-mode optical fiber according to claim 7, wherein the stress in the optical axis direction remaining in the outermost peripheral portion of the cladding is tensile stress of 0 to 10 MPa.

9. The multi-mode optical fiber according to claim 7, wherein the trench portion has an inner diameter greater than 2a, and an outer diameter smaller than 1.8b.

10. The multi-mode optical fiber according to claim 7, wherein the stress in the optical axis direction remaining in the outermost peripheral portion of the cladding is tensile stress of 0 to 10 MPa.

11. The multi-mode optical fiber according to claim 7, wherein the stress in the optical axis direction remaining in the core is the compressive stress.

* * * * *